United States Patent
Wendland et al.

(10) Patent No.: US 9,139,674 B2
(45) Date of Patent: Sep. 22, 2015

(54) RIGID AND CONTORTED DIVINYL CROSSLINKERS

(71) Applicant: 3M INNOVATIVE PROPERTIES COMPANY, St. Paul, MN (US)

(72) Inventors: Michael S. Wendland, North St. Paul, MN (US); Joseph D. Rule, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/430,062

(22) PCT Filed: Aug. 28, 2013

(86) PCT No.: PCT/US2013/056943
§ 371 (c)(1),
(2) Date: Mar. 20, 2015

(87) PCT Pub. No.: WO2014/051918
PCT Pub. Date: Apr. 3, 2014

(65) Prior Publication Data
US 2015/0232592 A1 Aug. 20, 2015

Related U.S. Application Data

(60) Provisional application No. 61/705,369, filed on Sep. 25, 2012.

(51) Int. Cl.
| | | |
|---|---|---|
| C08F 212/34 | (2006.01) | |
| C08F 212/08 | (2006.01) | |
| C08F 2/16 | (2006.01) | |
| C08F 4/34 | (2006.01) | |

(52) U.S. Cl.
CPC ................... C08F 212/08 (2013.01)

(58) Field of Classification Search
CPC .......... C08F 2/16; C08F 212/34; C07C 13/11
USPC ........................................................ 526/284
See application file for complete search history.

(56) References Cited

U.S. PATENT DOCUMENTS 3,945,968 A * 3/1976 Goletto .................... 524/367

FOREIGN PATENT DOCUMENTS

| | | |
|---|---|---|
| DE | 3434286 | 5/1985 |
| JP | 2002-334785 | 11/2002 |
| WO | WO 2012/015857 | 2/2012 |
| WO | WO 2012/015860 | 2/2012 |
| WO | WO 2013/070723 | 5/2013 |

OTHER PUBLICATIONS

Carta, "Novel Spirobisindanes for Use as Precursors to Polymers of Intrinsic Microporosity", Organic Letters, 2008, vol. 10, No. 13, pp. 2641-2643.
Ishiwari, "Poly(vinylspirobifluorene): Synthesis and Properties of a Novel Styrenic Polymer", Chemistry Letters, Jul. 2008, vol. 37, No. 8, pp. 854-855.
International Search Report for PCT International Application No. PCT/US2013/056943, mailed on Oct. 29, 2013, 3 pgs.

* cited by examiner

*Primary Examiner* — Fred M Teskin
(74) *Attorney, Agent, or Firm* — Jean A. Lown

(57) ABSTRACT

Polymerizable compositions containing rigid and contorted divinyl crosslinkers and polymeric materials prepared from the polymerizable compositions are described. The crosslinkers have a spirobisindane-type structure and can undergo free radical polymerization reactions. Methods of preparing the polymeric materials from the polymerizable compositions are also described.

15 Claims, 1 Drawing Sheet

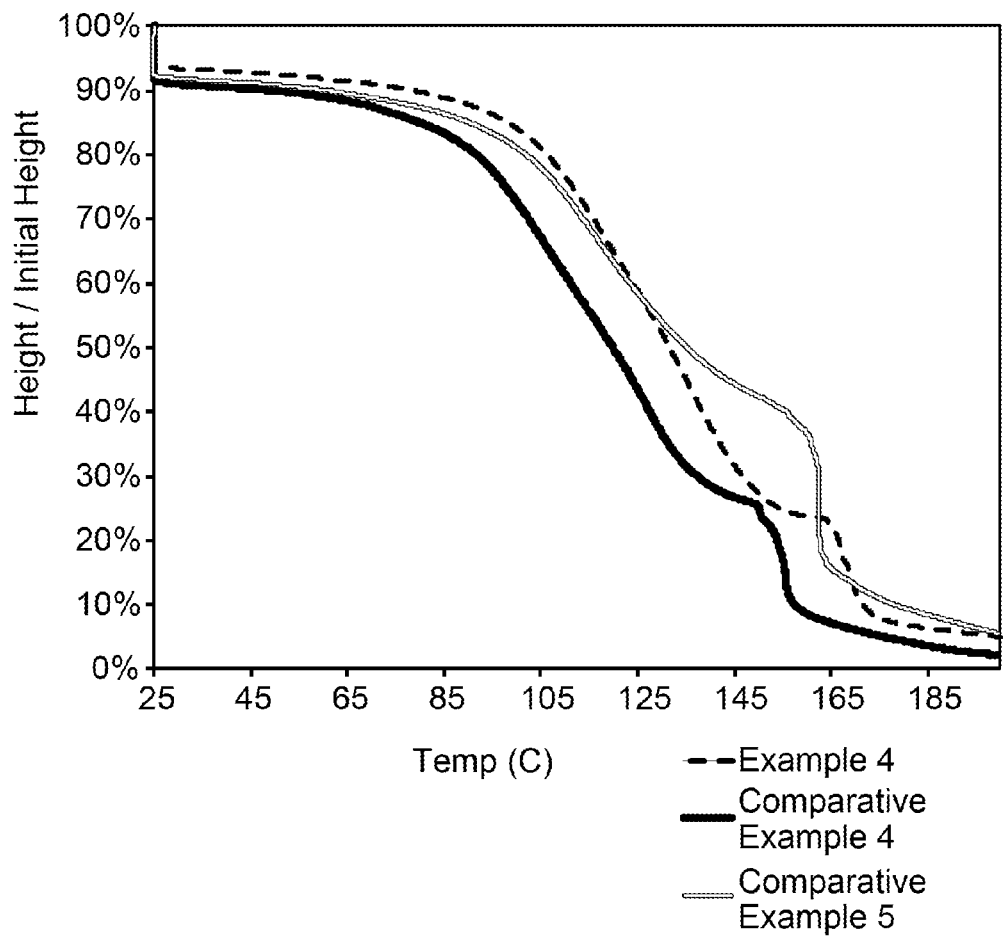

RIGID AND CONTORTED DIVINYL CROSSLINKERS

CROSS REFERENCE TO RELATED APPLICATION

This application is a national stage filing under 35 U.S.C. 371 of PCT/US2013/056943, filed Aug. 28, 2013, which claims priority to U.S. Provisional Application No. 61/705,369, filed Sep. 25, 2012, the disclosure of which is incorporated by reference in its/their entirety herein.

TECHNICAL FIELD

Polymerizable compositions containing rigid and contorted divinyl crosslinkers and polymeric materials prepared from the polymerizable compositions are described.

BACKGROUND

High performance specialty polymeric materials are desired for many applications. In particular, polymeric materials that can be used at relatively high pressures and/or at relatively high temperatures are desired for applications such as, for example, chromatographic media in high pressure chromatographic columns and proppant materials in the removal of oil and natural gas from subterranean formations. Polymeric materials suitable for these applications are usually crosslinked.

Divinylbenzene crosslinked polystyrene is an important polymeric system used as chromatographic media. Especially in the area of high pressure chromatography, it has been recognized that the use of higher pressures can impart even greater separation power. Thus, there is a growing demand for chromatographic media that can withstand greater pressures (and in some cases temperatures) without deforming.

Crosslinked polymeric beads have been used for oil recovery. The demand for oil has forced the oil industry to develop methods such as fracking in order to recover oil in hard to reach places such as shale rock formations. Such techniques require the use of proppant materials to keep fractures in the rock open (i.e., to prop the fractures in the rock open) so that the gas or oil can be extracted faster. The proppant materials must be resilient to deformation and fracture under the pressure and temperature conditions associated with oil recovery.

SUMMARY

Polymerizable compositions containing rigid and contorted divinyl crosslinkers and polymeric materials prepared from the polymerizable compositions are described. These crosslinkers can be used in place of other commonly used crosslinkers such as divinylbenzene and can result, for example, in the formation of polymeric materials with higher glass transition temperatures, greater resistance to compression, and improved thermal stability from monomers such as styrene, styrene substituted with one or more alkyl groups, alkyl (meth)acrylate, or a combination thereof.

In a first aspect, a polymerizable composition is provided. The polymerizable composition contains a) a monomer mixture and b) a free radical initiator. The monomer mixture includes i) a first monomer that is a crosslinker of Formula (I)

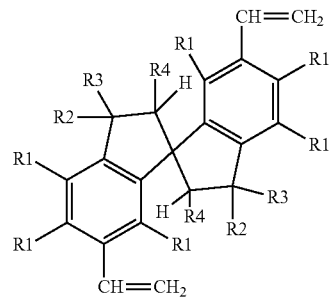

and ii) a second monomer that is styrene, styrene substituted with one or more alkyl groups, alkyl (meth)acrylate, or a combination thereof. In Formula (I), each R1 is independently hydrogen, halo, alkyl, aryl, alkaryl, or aralkyl. Each R2 is independently hydrogen, alkyl, alkoxy, aryl, alkaryl, aralkyl, hydroxyl, silyloxy, combines with a R3 connected to a same carbon atom to form a cyclic alkyl, combines with a R3 connected to the same carbon atom to form a cyclic alkyl that is fused to one or more carbocyclic rings, or combines with R3 and the carbon atom to which both R2 and R3 are connected to form a carbonyl group. Each R3 is independently hydrogen, alkyl, alkoxy, aryl, alkaryl, aralkyl, hydroxyl, silyloxy, combines with a R2 connected to a same carbon atom to form a cyclic alkyl, combines with a R2 connected to the same carbon atom to form a cyclic alkyl that is fused to one or more carbocyclic rings, combines with R2 and the carbon to which both R2 and R3 are connected to form a carbonyl group, or combines with R4 connected to adjacent carbon atom to form a carbon-carbon bond. Each R4 is independently hydrogen or combines with R3 connected to an adjacent carbon atom to form a carbon-carbon bond. The amount of the crosslinker of Formula (I) in the monomer mixture is up to 25 mole percent based on moles of the second monomer.

In a second aspect, a polymer is provided that is a polymerized product of a polymerizable composition as described above.

In a third aspect, a method of preparing a crosslinked polymeric is provided. The method includes providing a polymerizable composition as described above. The method further includes subjecting the polymerizable composition to free radical polymerization.

BRIEF DESCRIPTION OF THE DRAWINGS

The FIGURE is a plot of compression resistance versus temperature (° C.) for an exemplary polymer prepared using a crosslinker of Formula (I) and for two comparative examples using divinylbenzene as the crosslinker.

DETAILED DESCRIPTION

Polymerizable compositions containing rigid and contorted divinyl crosslinkers and polymeric materials prepared from the polymerizable compositions are described. The crosslinkers have a spirobisindane-type structure and can undergo free radical polymerization reactions. The polymerizable compositions include a first monomer that is the crosslinking monomer and a second monomer that is selected from styrene, styrene substituted with one or more alkyl groups, alkyl (meth)acrylate, and a combination thereof. Methods of preparing the polymeric material are also described.

The terms "a", "an", and "the" are used interchangeably with "at least one" to mean one or more of the elements being described.

The term "halo" refers to a monovalent group that is a radical of a halogen atom. The halo can be fluoro, chloro, bromo, or iodo.

The term "alkyl" refers to a monovalent group that is a radical of an alkane. The alkyl group can have 1 to 20 carbon atoms and can be linear, branched, cyclic, or a combination thereof. When the alkyl is linear, it can have 1 to 20 carbon atoms. When the alkyl is branched or cyclic, it can have 3 to 20 carbon atoms.

The term "alkoxy" refers to a monovalent group of formula —OR where R is an alkyl as defined above.

The term "aryl" refers to a monovalent group that is a radical of an aromatic carbocyclic compound. The aryl group has at least one aromatic carbocyclic ring and can have 1 to 5 optional rings that are connected to or fused to the aromatic carbocyclic ring. The additional rings can be aromatic, aliphatic, or a combination thereof. The aryl group usually has 5 to 20 carbon atoms.

The term "alkaryl" refers to an aryl group substituted with at least one alkyl group. The alkaryl group contains 6 to 40 carbon atoms. The alkaryl group often contains an aryl group having 5 to 20 carbon atoms and an alkyl group having 1 to 20 carbon atoms.

The term "aralkyl" refers to an alkyl group substituted with at least one aryl group. The aralkyl group contains 6 to 40 carbon atoms. The aralkyl group often contains an alkyl group having 1 to 20 carbon atoms and an aryl group having 5 to 20 carbon atoms.

The term "carbocyclic group" refers to an aliphatic or aromatic carbon ring structure. The carbocyclic group can be saturated, partially unsaturated, or unsaturated. The carbocyclic group often contains 5 to 20 carbon atoms.

The term "silyloxy" refers to a monovalent group of formula —Si(R5)3 where each R5 is independently an alkyl group having 1 to 20 carbon atoms or an aryl group having 5 to 20 carbon atoms.

The term "polymer" refers to both polymeric materials prepared from one monomer such as a homopolymer or to polymeric materials prepared from two or more monomers such as a copolymer, terpolymer, or the like. Likewise, the term "polymerize" refers to the process of making a polymeric material that can be a homopolymer, copolymer, terpolymer, or the like.

In a first aspect, a polymerizable composition is provided. The polymerizable composition contains a) a monomer mixture and b) a free radical initiator. The monomer mixture includes i) a first monomer that is a crosslinker of Formula (I)

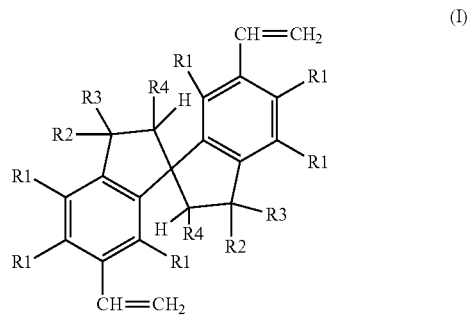

(I)

and ii) a second monomer that is styrene, styrene substituted with one or more alkyl groups, alkyl (meth)acrylate, or a combination thereof. In Formula (I), each R1 is independently hydrogen, halo, alkyl, aryl, alkaryl, or aralkyl. Each R2 is independently hydrogen, alkyl, alkoxy, aryl, alkaryl, aralkyl, hydroxyl, silyloxy, combines with a R3 connected to a same carbon atom to form a cyclic alkyl, combines with a R3 connected to the same carbon atom to form a cyclic alkyl that is fused to one or more carbocyclic rings, or combines with R3 and the carbon atom to which both R2 and R3 are connected to form a carbonyl group. Each R3 is independently hydrogen, alkyl, alkoxy, aryl, alkaryl, aralkyl, hydroxyl, silyloxy, combines with a R2 connected to a same carbon atom to form a cyclic alkyl, combines with a R2 connected to the same carbon atom to form a cyclic alkyl that is fused to one or more carbocyclic rings, combines with R2 and the carbon to which both R2 and R3 are connected to form a carbonyl group, or combines with R4 connected to adjacent carbon atom to form a carbon-carbon bond. Each R4 is independently hydrogen or combines with R3 connected to an adjacent carbon atom to form a carbon-carbon bond. The amount of the crosslinker of Formula (I) in the monomer mixture is up to 25 mole percent based on moles of the second monomer.

Each R1 in the crosslinker of Formula (I) is independently hydrogen, halo, alkyl, aryl, alkaryl, or aralkyl. Suitable halo groups include, but are not limited to, chloro and bromo. Suitable alkyl groups often have up to 20 carbon atoms, up to 10 carbon atoms, up to 6 carbon atoms, or up to 4 carbon atoms. For example, the alkyl groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl.

Each R2 in the crosslinker of Formula (I) is independently hydrogen, alkyl, alkoxy, aryl, alkaryl, aralkyl, hydroxyl, silyloxy, combines with a R3 connected to a same carbon atom to form a cyclic alkyl, combines with a R3 connected to the same carbon atom to form a cyclic alkyl that is fused to one or more carbocyclic rings, or combines with R3 and the carbon atom to which both R2 and R3 are connected to form a carbonyl group. Suitable alkyl and alkoxy groups often have up to 20 carbon atoms, up to 10 carbon atoms, up to 6 carbon atoms, or up to 4 carbon atoms. For example, the alkyl and alkoxy groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl. Suitable silyloxy groups are of formula —Si (R5)3 where each R5 is independently an alkyl group having 1 to 20 carbon atoms or an aryl group having 5 to 20 carbon atoms. Example R5 groups include, but are not limited to, phenyl and alkyl groups having 1 to 10 carbon atoms, 1 to 6 carbon atoms, or 1 to 3 carbon atoms. Suitable cyclic alkyl groups that form through the combination of R2 and R3 can have up to 10 carbon atoms, up to 8 carbon atoms, or up to 6 carbon atoms. In many embodiments, the cyclic alkyl group has 3 to 8 carbon atoms or 3 to 6 carbon atoms. The cyclic alkyl group can optionally be fused to one or more carbocyclic rings. Each carbocyclic ring typically has up to 10 carbon atoms, up to 8 carbon atoms, or up to 6 carbon atoms and can be aromatic (i.e., unsaturated), partially unsaturated, or saturated. The fused carbocyclic rings are often benzene rings. An example cyclic alkyl with one or more fused carbocyclic rings is fluorenyl (i.e., a monovalent radical of flourene).

Each R3 in the crosslinker of Formula (I) is independently hydrogen, alkyl, alkoxy, aryl, alkaryl, aralkyl, hydroxyl, silyloxy, combines with a R2 connected to a same carbon atom to form a cyclic alkyl, combines with a R2 connected to the same carbon atom to form a cyclic alkyl that is fused to one or more carbocyclic rings, combines with R2 and the carbon to which both R2 and R3 are connected to form a carbonyl group, or combines with R4 connected to adjacent carbon atom to form a carbon-carbon bond. Suitable alkyl and alkoxy groups often have up to 20 carbon atoms, up to 10 carbon atoms, up to 6 carbon atoms, or up to 4 carbon atoms. For example, the alkyl and alkoxy groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl. Suitable silyloxy groups are of formula —Si(R5)3 where each R5 is independently an alkyl group having 1 to 20 carbon atoms or an aryl group having 5 to 20 carbon atoms. Example R5 groups include, but are not limited to, phenyl and alkyl groups having 1 to 10 carbon atoms, 1 to 6 carbon atoms, or 1 to 3 carbon atoms. Suitable cyclic alkyl groups that form through the combination of R2 and R3 can have up to 10 carbon atoms, up to 8 carbon atoms, or up to 6 carbon atoms. In many embodiments, the cyclic alkyl group has 3 to 8 carbon atoms or 3 to 6 carbon atoms. The cyclic alkyl group can optionally be fused to one or more carbocyclic rings. Each carbocyclic ring typically has up to 10 carbon atoms, up to 8 carbon atoms, or up to 6 carbon atoms and can be aromatic (i.e., unsaturated), partially unsaturated, or saturated. The fused carbocyclic rings are often benzene rings. An example cyclic alkyl with one or more fused carbocyclic rings is fluorenyl (i.e., a monovalent radical of flourene).

Each R4 in the crosslinker of Formula (I) is independently hydrogen or combines with R3 connected to an adjacent carbon atom to form a carbon-carbon bond.

In some more specific embodiments of the crosslinker of Formula (I), R1 is hydrogen or halo, R2 is alkyl having 1 to 10 carbon atoms (e.g., 1 to 6 carbon atoms, 1 to 4 carbon atoms, 1 to 3 carbon atoms, or 1 carbon atom), R3 is alkyl having 1 to 10 carbon atoms (e.g., 1 to 6 carbon atoms, 1 to 4 carbon atoms, 1 to 3 carbon atoms, or 1 carbon atom), and R4 is hydrogen. In an even more specific embodiment of the crosslinker of Formula (I), R1 is hydrogen, R2 is methyl, R3 is methyl, and R4 is hydrogen; this monomer is 3,3,3',3'-tetramethyl-1,1'-spirobisindan-6,6'-divinyl.

The crosslinker of Formula (I) can be prepared using any known method. For example, monomers where R1 and R4 are hydrogen and where R2 and R3 are alkyl can be prepared as shown in Reaction Scheme A.

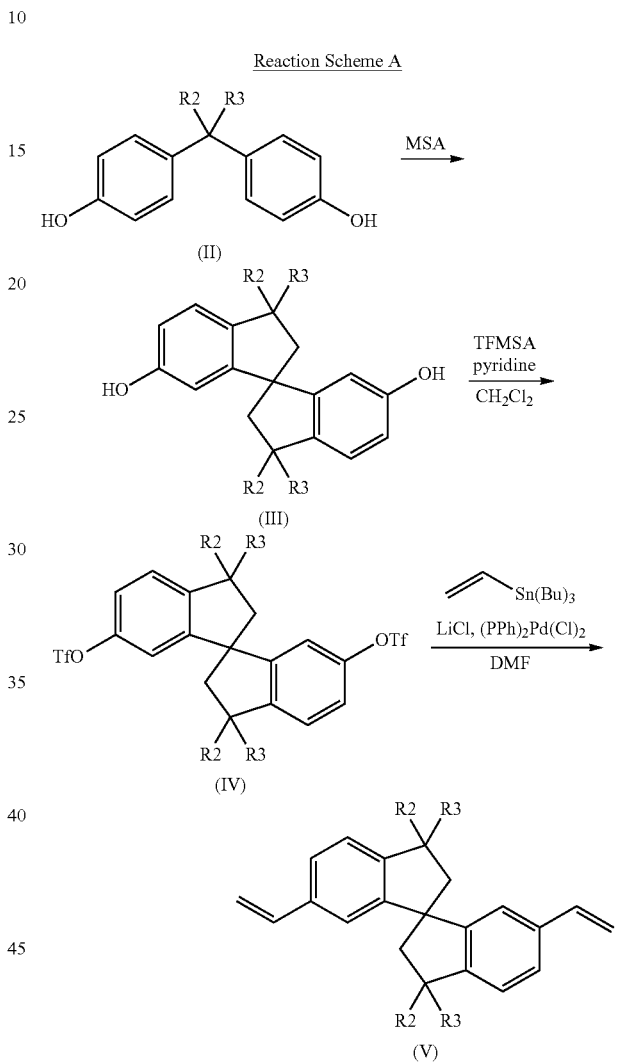

A bisphenol compound of Formula (II) is reacted with methane sulfonic acid (MSA) to produce the spirobisindan-6,6'-diol compound of Formula (III). The spirobisindan-6,6'-diol can be reacted with trifluoromethane sulfonic anhydride (TFMSA) in the presence of pyridine and a solvent such as methylene chloride to produce the spirobisindan-6,6'-bistriflate compound of Formula (IV). The spirobisindan-6,6'-bistriflate compound can subsequently be subjected to a Stille coupling reaction to produce the spirobisindane-6,6'-divinyl compound of Formula (V). That is, the compound of Formula (IV) can be reacted with vinyltributyl tin to introduce polymerizable groups. The details for this synthesis approach are further described in the Example section for the preparation of the monomer 3,3,3',3'-tetramethyl-1,1'-spirobisindan-6,6'-divinyl starting from bisphenol A as the compound of Formula (II).

Crosslinkers of Formula (I) where R2 and R3 combine with the carbon atom to which both R2 and R3 are connected to form a carbonyl group can be prepared as shown in Reaction Scheme B.

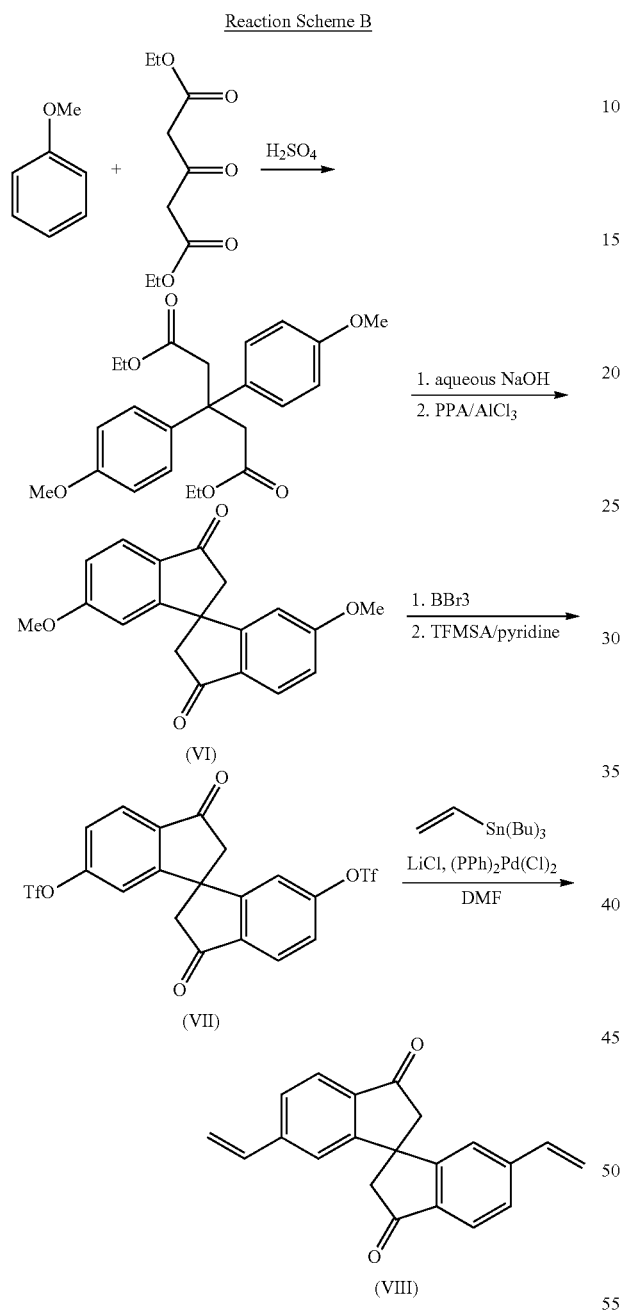

The chemistry involved in the formation of the dione (Compound (VI)) is described in Org. Lett., 10, 2641-2643 (2008). More specifically, diethyl-1,3-acetonedicarboxylate and methoxybenzene are reacted in the presence of sulfuric acid. This reaction is followed by hydrolysis and then Friedel-Crafts acylation mediated by polyphosphoric acid (PPA). The dione (Compound (VI)) is then reacted with $BBr_3$ to convert the methoxy groups to hydroxyl groups. The hydroxyl groups are then reacted with trifluoromethane sulfonic anhydride (TFMSA) in the presence of pyridine and a solvent such as methylene chloride to produce the triflate groups in Compound (VII). The triflate groups can be reacted with vinyltributyl tin to introduce the polymerizable groups in Compound (VIII).

The dione (Compound (VI)) from Reaction Scheme B can be used as a precursor to prepare various other crosslinkers of Formula (I) using Grignard reactions. By the appropriate selection of the Grignard reagent, this method can be used in the preparation of a compound of Formula (I) where R2 or R3 is an alkyl, aryl, alkaryl, or aralkyl. This type of reaction is exemplified using phenyl magnesium bromide as the Grignard reagent in Reaction Scheme C.

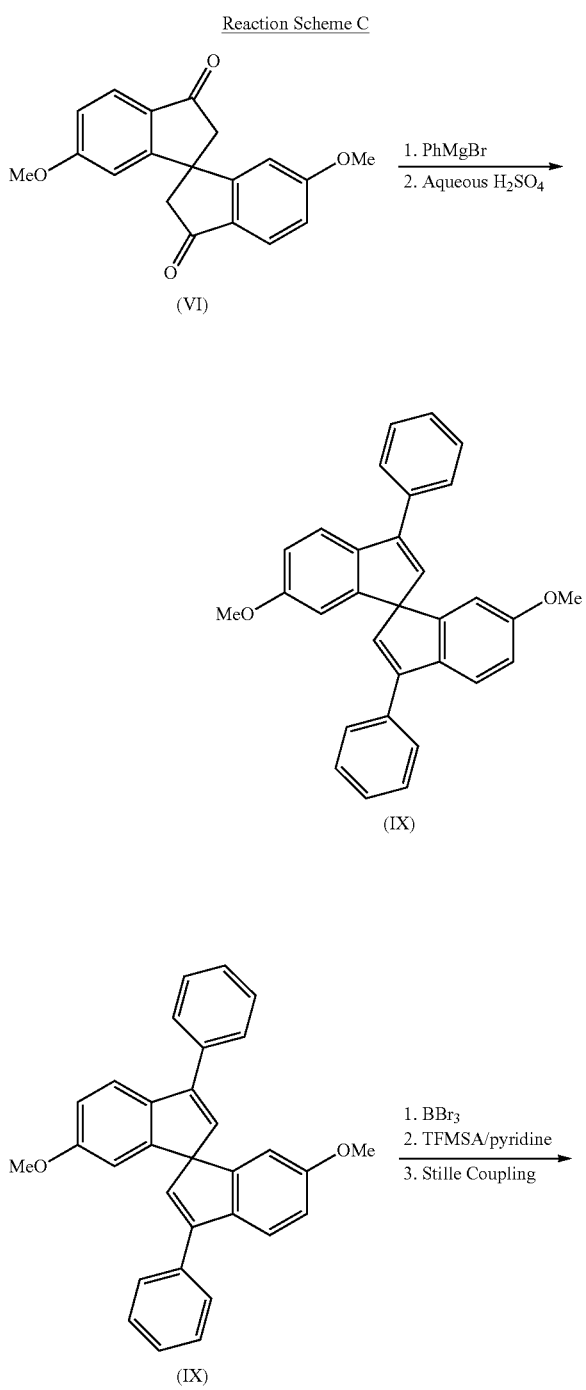

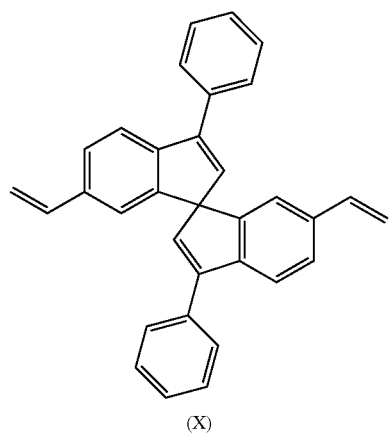

(X)

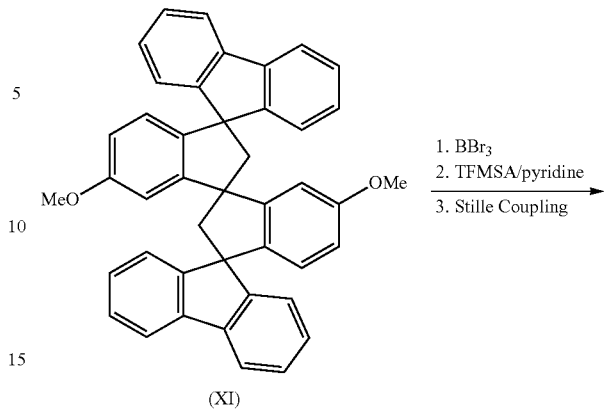

(XI)

The dehydrated bisindane (Compound (IX)) is formed after treatment with aqueous sulfuric acid. The methoxy groups in Compound (IX) can be converted to vinyl groups as in Reaction Scheme B resulting in the formation of Compound (X).

A more complex Grignard reagent such as biphenyl magnesium bromide can be used as well. This reaction is shown in Reaction Scheme D where spirofluorene groups are introduced to prepare Compound (XI). This can be converted to the divinyl Compound (XII) using the same three reactions described for Reaction Schemes B and C.

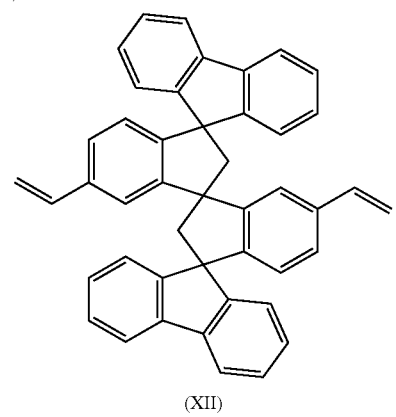

(XII)

Compound (VII) from Reaction Scheme B can be used to prepare a compound of Formula (I) where R2 or R3 is an hydroxyl group. This is illustrated in Reaction Scheme E. A strong base can be reacted with Compound (VII) to form Compound (XIII). The triflate groups in Compound (XIII) can be changed to vinyl groups using a Stille coupling reaction as described in Reaction Scheme A to prepare Compound XIV.

Reaction Scheme D

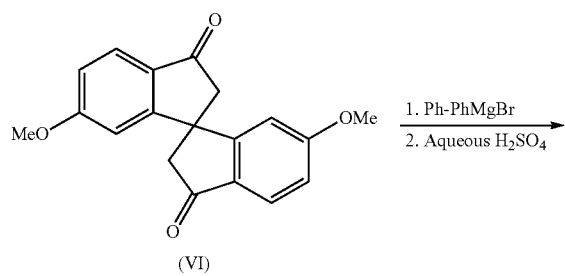

(VI)

Reaction Scheme E

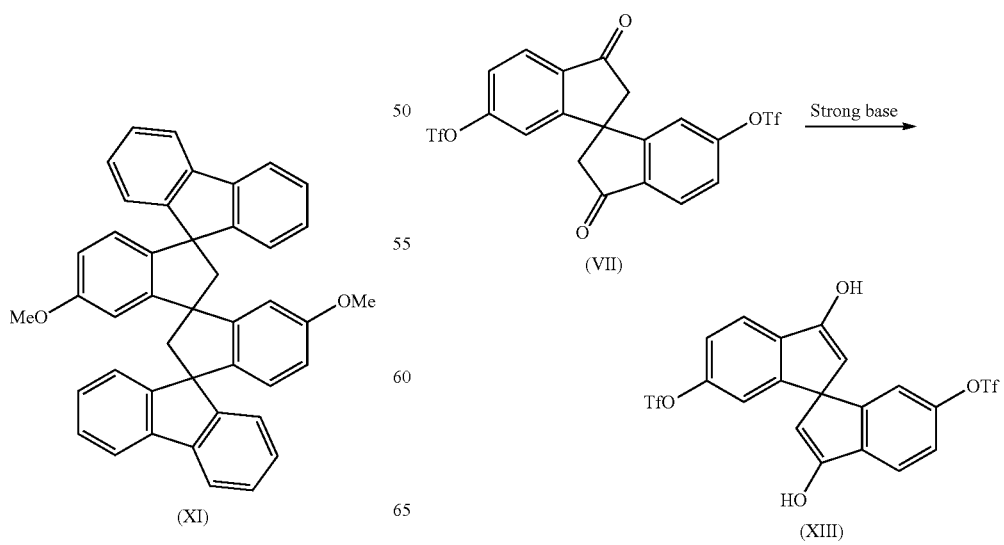

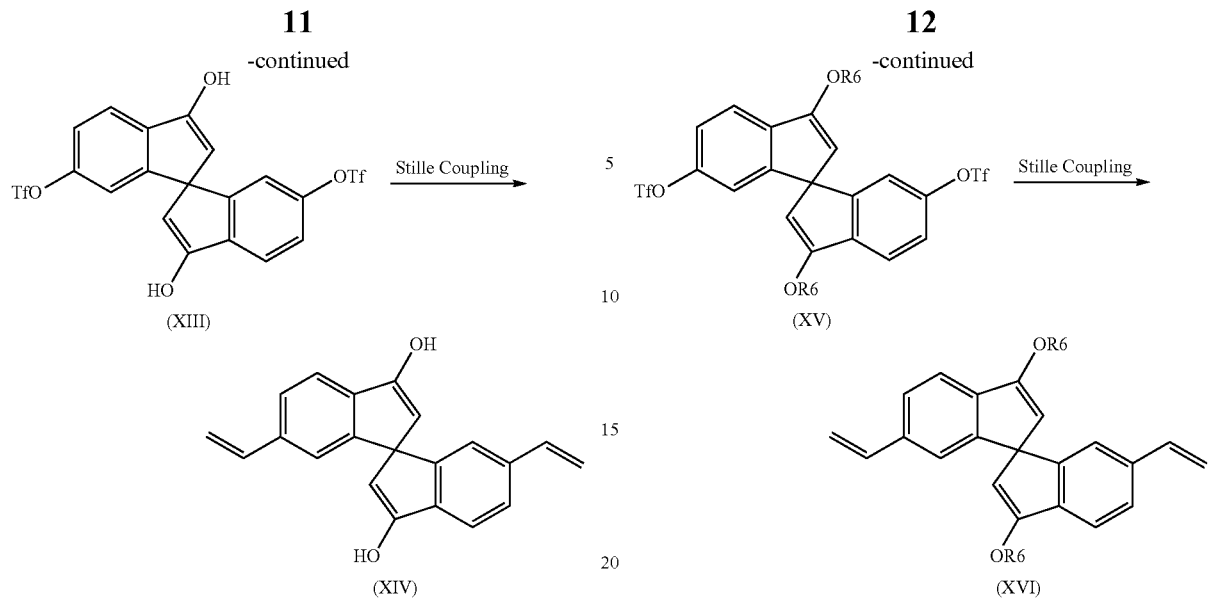

Where R2 or R3 is alkoxy or silyloxy, a strong base can be used to convert Compound (VII) to Compound (XIII) as in Reaction Scheme E. Then, as shown in Reaction Scheme F, Compound (XIII) can be reacted with a compound (R6)X where X is halo and R6 is an alkyl or silyl of formula —Si(R5)$_3$ and where R5 is alkyl or aryl. The product is Compound (XV) with two groups —OR6. This compound can be converted to the divinyl Compound (XVI) using a Stille coupling reaction as described for Reaction Scheme A.

Reaction Scheme F

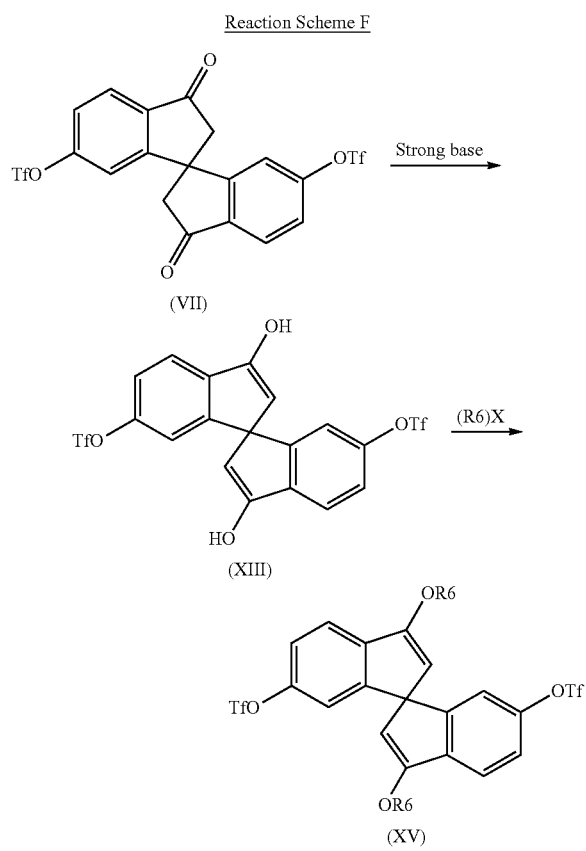

The polymerizable composition contains up to 25 mole percent of the crosslinker of Formula (I) based on total moles of the second monomer (i.e., mole percent crosslinker of Formula (I) is equal to [moles of crosslinker of Formula (I)÷moles of second monomer]×100). If more than 25 mole percent of the crosslinker of Formula (I) is used, the resulting polymeric material may be too highly crosslinked for many applications. For example, the resulting polymeric material may be too brittle. In some embodiments, the monomer mixtures contain up to 20 mole percent, up to 15 mole percent, up to 10 mole percent, or up to 5 mole percent of the crosslinker of Formula (I). Often, the polymerizable compositions contain at least 1 mole percent of the crosslinker of Formula (I) based on moles of second monomer in the monomer mixture. If less than 1 mole percent of the crosslinker of Formula (I) is used, the resulting polymeric material may be too easily deformed for many applications. The monomer mixture often contains at least 2 mole percent, at least 5 mole percent, or at least 10 mole percent of the crosslinker of Formula (I). In some embodiments, the monomer mixture contains an amount of the crosslinker of Formula (I) in a range of 1 to 25 mole percent, in a range of 1 to 20 mole percent, in a range of 1 to 15 mole percent, in a range of 1 to 10 mole percent, in a range of 2 to 25 mole percent, in a range of 2 to 20 mole percent, in a range of 2 to 10 mole percent, in a range of 5 to 25 mole percent, in a range of 5 to 20 mole percent, in a range of 5 to 10 mole percent, in a range of 10 to 25 mole percent, or in a range of 10 to 20 mole percent.

Stated in terms of a total weight of monomers in the monomer mixture, the polymerizable composition often contains up to 60 weight percent of the crosslinker of Formula (I). For example, the polymerizable composition can contain up to 50 weight percent, up to 40 weight percent, up to 30 weight percent, or up to 20 weight percent of the crosslinker of Formula (I). The polymerizable composition typically contains at least 1 weight percent, at least 2 weight percent, at least 5 weight percent, or at least 10 weight percent of the crosslinker of Formula (I).

In addition to the crosslinker of Formula (I), the monomer mixture includes a second monomer with a single ethylenically unsaturated group. The second monomer is usually styrene, styrene substituted with one or more alkyl groups, alkyl (meth)acrylate, or a combination thereof. Suitable alkyl groups that can be used as substituents for styrene often have 1 to 20 carbon atoms, 1 to 10 carbon atoms, 1 to 6 carbon atoms, or 1 to 4 carbon atoms. Examples of styrene substituted with alkyl groups include, but are not limited to, ethyl styrene and tert-butyl styrene. Suitable alkyl (meth)acrylates typically have an alkyl group with 1 to 20 carbon atoms, 1 to 10 carbon atoms, 1 to 6 carbon atoms, or 1 to 4 carbon atoms. Example alkyl (meth)acrylates include, but are not limited to, methyl (meth)acrylate, ethyl (meth)acrylate, n-propyl (meth) acrylate, isopropyl (meth)acrylate, n-butyl (meth)acrylate, isobutyl (meth)acrylate, pentyl (meth)acrylate, 2-methylbutyl (meth)acrylate, n-hexyl (meth)acrylate, cyclohexyl (meth)acrylate, 4-methyl-2-pentyl (meth)acrylate, n-heptyl (meth)acrylate, n-octyl (meth)acrylate, isooctyl (meth)acrylate, 2-ethylhexyl (meth)acrylate, isoamyl (meth)acrylate, nonyl (meth)acrylate, isononyl (meth)acrylate, n-decyl (meth)acrylate, isodecyl (meth)acrylate, lauryl (meth)acrylate, isotridecyl (meth)acrylate, stearyl (meth)acrylate, isobornyl (meth)acrylate, and the like. In many embodiments, the alkyl (meth)acrylates are alkyl methacrylates.

The polymerizable composition often contains 1 to 60 weight percent of the crosslinker of Formula (I) and 40 to 99 weight percent of the second monomer based on a total weight of the monomer mixture. For example, the polymerizable composition can contain 2 to 60 weight percent of the crosslinker of Formula (I) and 40 to 98 weight percent second monomer, 5 to 60 weight percent of the crosslinker of Formula (I) and 40 to 95 weight percent of the second monomer, 5 to 50 weight percent of the crosslinker of Formula (I) and 50 to 95 weight percent of the second monomer, 5 to 40 weight percent of the crosslinker of Formula (I) and 60 to 95 weight percent of the second monomer, 5 to 30 weight percent of the crosslinker of Formula (I) and 70 to 95 weight percent of the second monomer, or 5 to 20 weight percent of the crosslinker of Formula (I) and 80 to 95 weight percent of the second monomer.

In some embodiments, an additional crosslinker that is not of Formula (I) can be added to the monomer mixture. Suitable additional crosslinkers are those that have a plurality (e.g., 2 to 4) of ethylenically unsaturated groups and that are miscible with the crosslinker of Formula (I) and the second monomer in the monomer mixture. The additional crosslinker is often selected to be hydrophobic.

Suitable additional crosslinkers include, but are not limited to divinylbenzene, divinylbenzene substituted with one or more alkyl groups, trivinylbenzene, trivinylbenzenes substituted with one or more alkyl groups, and aliphatic (meth) acrylates with two to four methacryloyl groups. Example aliphatic (meth)acrylates with two (meth)acryloyl groups include, but are not limited to, various alkylene diol di(meth) acrylates (e.g., 1,6-hexanediol dimethacrylate) and various alkylene glycol di(meth)acrylates (e.g., ethylene glycol di(meth)acrylate, triethylene glycol di(meth)acrylate, and tripropyleneglycol di(meth)acrylate, and polyalkyleneglycol di(meth)acrylate such as that commercially available under the trade designation BISOMER™ EP100DMA from Cognis Co. (Germany)). Example aliphatic (meth)acrylates with three (meth)acryloyl groups include, but are not limited to, trimethylolpropane tri(meth)acrylate, pentaeritritol tri(meth) acrylate, propoxylated trimethylolpropane tri(meth)acrylate such as the material commercially available under the trade designation CD501 from Sartomer Co. (Exton, Pa.). Example aliphatic (meth)acrylates with four (meth)acryloyl groups include, but are not limited to, di-trimethylolpropane tetra (meth)acrylate and pentaeritritol tetra(meth)acrylate. In many embodiments, the (meth)acryloyl groups are methacryloyl groups.

When an additional crosslinker is used in combination with the crosslinker of Formula (I) in the polymerizable compositions, the total amount of crosslinker can be up to 25 mole percent but the amount of the crosslinker of Formula (I) is at least 1 mole percent. For example, the polymerizable composition can contain 1 to 24 mole percent of the crosslinker of Formula (I) and 1 to 24 mole percent of the additional crosslinker. Typically, the crosslinker of Formula (I) is at least 5 percent of the total moles of crosslinker in the polymerizable composition. For example, the crosslinker of Formula (I) is at least 10 percent, at least 20 percent, at least 30 percent, at least 40 percent, at least 50 percent, at least 60 percent, at least 70 percent, at least 80 percent, at least 90 percent, or at least 95 percent of the total moles of crosslinker in the polymerizable composition.

In addition to the various monomers, the polymerizable compositions typically include an initiator for free radical polymerization reactions. Any suitable free radical initiator can be used. In some embodiments, the free radical initiator is a thermal initiator that can be activated at a temperature above room temperature. In other embodiments, the free radical initiator is a redox initiator. Suitable free radical initiators are typically selected to be miscible with the monomers included in the polymerizable composition. The free radical initiator is typically present in an amount in a range of 0.05 to 10 weight percent, in a range of 0.05 to 5 weight percent, in a range of 0.05 to 2 weight percent, in a range of 0.05 to 1 weight percent, in a range of 0.1 to 5 weight percent, in a range of 0.2 to 5 weight percent, in a range of 0.5 to 5 weight percent, in a range of 0.1 to 2 weight percent, or in a range of 0.1 to 1 weight percent. The weight percent is based on a total weight of monomer in the polymerizable composition. Both the type and amount of initiator can affect the polymerization rate.

Suitable thermal initiators include organic peroxides and azo compounds. Example azo compounds include, but are not limited to, those commercially available under the trade designation VAZO from E.I. du Pont de Nemours Co. (Wilmington, Del.) such as VAZO 64 (2,2'-azobis(isobutyronitrile), which is often referred to as AIBN) and VAZO 52 (2,2'-azobis (2,4-dimethylpentanenitrile)). Other azo compounds are commercially available from Wako Chemicals USA, Inc. (Richmond, Va.) such as V-601 (dimethyl 2,2'-azobis(2-methylproprionate)), V-65 (2,2'-azobis(2,4-dimethyl valeronitrile)), and V-59 (2,2'-azobis(2-methylbutyronitrile)). Organic peroxides include, but are not limited to, bis(1-oxoaryl)peroxides such as benzoyl peroxide (BPO), bis(1-oxoalkyl)peroxides such as lauroyl peroxide, and dialkyl peroxides such as dicumyl peroxide or di-tert-butyl peroxide and mixtures thereof. The temperature needed to activate the initiator is often in a range of 25° C. to 160° C., 30° C. to 160° C., or 40° C. to 160° C.

Suitable redox initiators include arylsulfinate salts, triarylsulfonium salts, or N,N-dialkylaniline (e.g., N,N-dimethylaniline) in combination with a metal in an oxidized state, a peroxide, or a persulfate. Specific arylsulfinate salts include tetraalkylammonium arylsulfinates such as tetrabutylammonium 4-ethoxycarbonylbenzenesulfinate, tetrabutylammonium 4-trifluoromethylbenzenesulfinate, and tetrabutylammonium 3-trifluoromethylbenzenesulfinate. Specific triarylsulfonium salts include those with a triphenylsulfonium cation and with an anion selected from $PF_6^-$, $AsF_6^-$, and $SbF_6^-$. Suitable metal ions include, for example, ions of group III metals, transition metals, and lanthanide metals. Specific metal ions include, but are not limited to, Fe(III), Co(III), Ag(I), Ag(II), Cu(II), Ce(III), Al (III), Mo(VI), and Zn(II). Suitable peroxides include benzoyl peroxide, lauroyl peroxide, and the like. Suitable persulfates include, for example, ammonium persulfate, tetraalkylammonium persulfate (e.g., tetrabutylammonium persulfate), and the like.

In yet another aspect, a method of preparing a crosslinked polymeric material is provided. This method includes preparing a polymerizable composition that includes a monomer mixture, a free radical initiator, and an optional organic solvent. The method further includes subjecting the polymerizable composition to free radical polymerization. The polymerization can proceed using any known polymerization processes such as bulk polymerization methods, solution polymerization methods, suspension polymerization methods, or emulsion polymerization methods.

With bulk polymerization methods, little or no organic solvent is included in the polymerizable composition. With solution polymerization methods, the various monomers in the monomer mixture are dissolved in a miscible organic solvent. Suitable organic solvents include, but are not limited to, ethyl acetate, amyl acetate (n-penyl acetate), toluene, cyclohexane, cyclohexanone and methyl ethyl ketone. Any suitable percent solids can be used in the polymerizable composition. If the percent solids are too low, more solvent needs to be removed from the polymerized product. Additionally, lower percent solids may adversely affect the rate of polymerization. On the other hand, if the percent solids are too high, the polymerizable composition may have an unacceptably high viscosity. The percent solids are often in a range of 0.5 to 50 weight percent, 1 to 40 weight percent, 1 to 30 weight percent, 1 to 20 weight percent, 1 to 15 weight percent, 1 to 10 weight percent, 1 to 6 weight percent, or 2 to 6 weight percent based on a total weight of the polymerizable composition.

In addition to the percent solids of the polymerizable composition, the rate of polymerization can be controlled by selection of the polymerization temperature, the initiator, and the amount of the initiator. The rate of polymerization is typically increased by increasing the temperature and by addition of higher amounts of the initiator.

The polymeric material prepared using bulk polymerization methods or solution polymerization methods is often a monolith that can be easily broken apart for washing to remove any residual monomer. The washed product can be dried to form a powder. The polymer material can also be post-cured at a high temperature. High temperature post-curing can help increase the degree of conversion of the polymerizable groups in the reaction mixture. High temperature post-curing can increase the glass transition temperature of the polymeric material, can increase the resistance of the polymeric material to deformation at elevated temperatures, or both. The post-curing temperature can be greater than 100° C., greater than 130° C., or greater than 150° C.

Alternatively, suspension polymerization methods can be used to form the crosslinked polymeric material. In this type of polymerization method, an organic phase is prepared that includes the monomer mixture and the free radical initiator. Optional organic solvent that is miscible with the monomers can also be part of the organic phase. The organic phase is suspended in an aqueous phase that includes water and a suspending agent. That is, the polymerizable composition includes both an organic phase and a separate aqueous phase. The polymerizable composition is typically stirred sufficiently so that droplets of the organic phase form within the aqueous phase. As polymerization proceeds, the polymeric network grows within the suspended droplets resulting in the formation of polymeric beads.

In the suspension polymerization method, the organic phase composition usually includes the same components described above for bulk and solution polymerization methods. The same mole percent of the crosslinker monomer described above is suitable for the organic phase. The same amounts of the free radical initiator described above for use in the polymerizable composition are suitable for the organic phase.

Like the bulk polymerization methods described above, the organic phase for suspension polymerization methods often contains no organic solvent. The free radical initiator and the crosslinker are typically dissolved directly in the second monomer. If an organic solvent is present, the percent solids of the organic phase is often at least 60 weight percent, at least 70 weight percent, at least 80 weight percent, at least 90 weight percent, at least 95 weight percent, or at least 98 weight percent based on a total weight of the organic phase.

The organic phase is suspended in the aqueous phase. The volume ratio of the aqueous phase to the organic phase is typically greater than 1:1. That is, the volume of the aqueous phase exceeds the volume of the organic phase. The volume ratio aqueous phase: organic phase is often at least 2:1, at least 3:1, at least 4:1, or at least 5:1. Besides functioning as an inert medium for suspension of the organic phase droplets, the aqueous phase dissipates the heat generated during the polymerization reaction.

The aqueous phase for the suspension polymerization method includes a suspending agent to facilitate formation of the organic phase droplets. The suspending agent modifies the interfacial tension between the aqueous phase and the organic phase. Additionally, the suspending agent provides steric stabilization of the organic phase droplets. This steric stabilization tends to minimize or prevent the formation of agglomerated particles during the polymerization process.

The suspending agent is often a non-ionic surfactant such as cellulose polymers (e.g., methyl cellulose, carboxy methyl cellulose, carboxymethyl methyl cellulose, hydroxypropyl methyl cellulose, and hydroxybutyl methyl cellulose), gelatin, poly(vinyl alcohol), partially hydrolyzed poly(vinyl alcohol), (meth)acrylate polymers (e.g., poly(methacrylic acid), sodium poly(methacrylic acid), and ethylene maleic anhydride copolymers. Other suitable suspending agents include poly(styrene sulfonates) (e.g., sodium poly(styrene sulfonate)), talc, hydroxyapatite, barium sulfate, kaolin, magnesium carbonate, magnesium hydroxide, calcium phosphate, and aluminum hydroxide.

The amount of the suspending agent in the aqueous phase is often at least 0.05 weight percent, at least 0.1 weight percent, at least 0.2 weight percent, at least 0.5 weight percent. The amount of suspending agent can influence the size of the polymeric beads (i.e., the use of larger amounts of suspending agent often results in the formation of smaller polymeric beads). In some embodiments, the aqueous phase contains 0.05 to 10 weight percent suspending agent. For example, the aqueous phase can contain an amount of suspending agent in a range of 0.05 to 5 weight percent, in a range of 0.1 to 10 weight percent, in a range of 0.1 to 5 weight percent, in a range of 0.1 to 3 weight percent, or in a range of 0.5 to 5 weight percent. The weight percent is based on a total weight of the aqueous phase.

The size of the polymeric bead is determined, to a large extent, by the size of the organic phase droplets. The droplet size can be affected by variables such as the rate of agitation, the temperature, the choice of suspending agent, and the amount of suspending agent. The rate of agitation, the type of suspending agent, and the amount of suspending agent can often be varied to control the aggregation or agglomeration of the resulting particles. A lack of aggregation is generally preferred. In some embodiments, the density of the aqueous phase can be selected to be approximately the same as the organic. Approximately matching these densities tends to result in the formation of more spherical particles as well as more uniformly sized particles.

The particles (e.g., beads) prepared using suspension polymerization methods often have an average diameter of at least 50 micrometers, at least 200 micrometers, or at least 300 micrometers. For example, the average diameter is often in a range of 50 to 5000 micrometers, in a range of 100 to 3000 micrometers, in a range of 100 to 2000 micrometers, in a range of 200 to 2000 micrometers, in a range of 500 to 2000 micrometers, or in a range of 300 to 1000 micrometers.

The crosslinked polymeric materials prepared using a crosslinker of Formula (I) often have a glass transition temperature that is greater than for crosslinked polymeric materials prepared using comparable amounts of divinylbenzene (i.e., same molar ratio crosslinker to the second monomer). The glass transition temperature is often in a range of about 1° C. to about 25° C. higher depending on the amount of the crosslinker included in the monomer mixture.

Additionally, the crosslinked polymeric materials prepared using a crosslinker of Formula (I) typically are more thermally stable than crosslinked polymeric materials prepared using comparable amounts of divinylbenzene (i.e., same molar ratio crosslinker to the second monomer). The difference in the onset temperature for significant weight loss when analyzed using thermogravimetric analysis is often in a range of about 40° C. to about 50° C. higher regardless of the amount of crosslinker included in the monomer mixture.

The crosslinked polymeric materials prepared using a crosslinker of Formula (I) often compresses less under a given force within certain temperature ranges (e.g., temperatures near the glass transition temperature for the polymeric material) compared to crosslinked polymeric materials prepared using comparable amounts of divinylbenzene (i.e., same molar ratio crosslinker to the second monomer). That is, the crosslinked polymeric materials prepared using a crosslinker of Formula (I) are well suited for applications where materials with higher compression resistance would be advantageous.

In one exemplary use, the crosslinked polymeric materials can function as a size exclusion resin. Size exclusion resins are typically placed in a chromatographic column. Molecules in a solution can be separated based on their size and/or molecular weight by passing the solution through the chromatographic column. The crosslinked polymeric materials can withstand the pressure typically encountered in such chromatographic columns and would deform or compress less than divinylbenzene crosslinked polymeric materials.

In another exemplary use, the crosslinked polymeric materials can be used as proppant particles. The crosslinked polymeric materials are compatible with temperatures and pressures typically encountered in the removal of gas and oil from various subterranean formations. Furthermore, the crosslinked polymeric materials have sufficient resistance to deformation and fracture to function as effective proppant particles.

Various items are provided that are polymerizable compositions, polymeric materials formed from the polymerizable compositions, or methods of making polymeric material from the polymerizable compositions.

Item 1 is a polymerizable composition. The polymerizable composition contains a) a monomer mixture and b) a free radical initiator. The monomer mixture includes i) a first monomer that is a crosslinker of Formula (I)

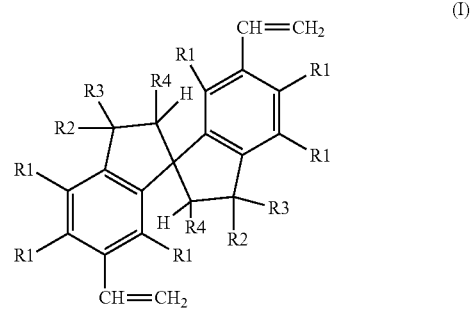

and ii) a second monomer that is styrene, styrene substituted with one or more alkyl groups, alkyl (meth)acrylate, or a combination thereof. In Formula (I), each R1 is independently hydrogen, halo, alkyl, aryl, alkaryl, or aralkyl. Each R2 is independently hydrogen, alkyl, alkoxy, aryl, alkaryl, aralkyl, hydroxyl, silyloxy, combines with a R3 connected to a same carbon atom to form a cyclic alkyl, combines with a R3 connected to the same carbon atom to form a cyclic alkyl that is fused to one or more carbocyclic rings, or combines with R3 and the carbon atom to which both R2 and R3 are connected to form a carbonyl group. Each R3 is independently hydrogen, alkyl, alkoxy, aryl, alkaryl, aralkyl, hydroxyl, silyloxy, combines with a R2 connected to a same carbon atom to form a cyclic alkyl, combines with a R2 connected to the same carbon atom to form a cyclic alkyl that is fused to one or more carbocyclic rings, combines with R2 and the carbon to which both R2 and R3 are connected to form a carbonyl group, or combines with R4 connected to adjacent carbon atom to form a carbon-carbon bond. Each R4 is independently hydrogen or combines with R3 connected to an adjacent carbon atom to form a carbon-carbon bond. The amount of the crosslinker of Formula (I) in the monomer mixture is up to 25 mole percent based on moles of the second monomer.

Item 2 is the polymerizable composition of item 1, wherein each R1 of the first monomer is hydrogen or halo.

Item 3 is the polymerizable composition of item 1 or 2, wherein each R2 and each R3 of the first monomer are alkyl.

Item 4 is the polymerizable composition of any one of items 1 to 3, wherein R4 of the first monomer is hydrogen.

Item 5 is the polymerizable composition of any one of items 1 to 4, wherein the first monomer is 3,3,3',3'-tetramethyl-1,1'-spirobisindan-6,6'-divinyl.

Item 6 is the polymerizable composition of any one of items 1 to 5, wherein the monomer mixture comprises 1 to 25 mole percent of the first monomer of Formula (I).

Item 7 is the polymerizable composition of any one of items 1 to 6, wherein the polymerizable composition comprises (1) an organic phase comprising the monomer mixture and a free radical initiator and (2) an aqueous phase comprising water and a suspending agent, wherein the organic phase is suspended as droplets within the aqueous phase.

Item 8 is the polymerizable composition of any one of items 1 to 7, wherein the polymerizable composition further comprises an additional crosslinker that is not of Formula (I), Item 9 is a polymeric material that comprises the polymerized product of a polymerizable composition. The polymerizable composition contains a) a monomer mixture and b) a free radical initiator. The monomer mixture includes i) a first monomer that is a crosslinker of Formula (I)

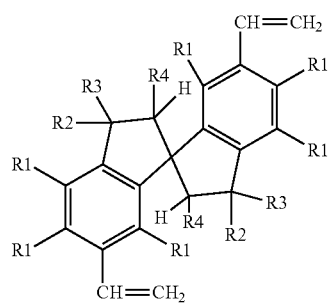
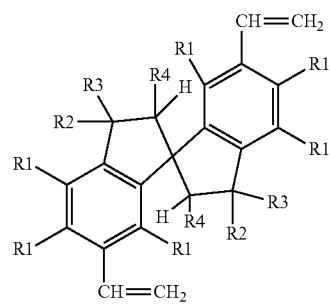

and ii) a second monomer that is styrene, styrene substituted with one or more alkyl groups, alkyl (meth)acrylate, or a combination thereof. In Formula (I), each R1 is independently hydrogen, halo, alkyl, aryl, alkaryl, or aralkyl. Each R2 is independently hydrogen, alkyl, alkoxy, aryl, alkaryl, aralkyl, hydroxyl, silyloxy, combines with a R3 connected to a same carbon atom to form a cyclic alkyl, combines with a R3 connected to the same carbon atom to form a cyclic alkyl that is fused to one or more carbocyclic rings, or combines with R3 and the carbon atom to which both R2 and R3 are connected to form a carbonyl group. Each R3 is independently hydrogen, alkyl, alkoxy, aryl, alkaryl, aralkyl, hydroxyl, silyloxy, combines with a R2 connected to a same carbon atom to form a cyclic alkyl, combines with a R2 connected to the same carbon atom to form a cyclic alkyl that is fused to one or more carbocyclic rings, combines with R2 and the carbon to which both R2 and R3 are connected to form a carbonyl group, or combines with R4 connected to adjacent carbon atom to form a carbon-carbon bond. Each R4 is independently hydrogen or combines with R3 connected to an adjacent carbon atom to form a carbon-carbon bond. The amount of the crosslinker of Formula (I) in the monomer mixture is up to 25 mole percent based on moles of the second monomer.

Item 10 is the polymer of item 9, wherein the monomer mixture comprises 1 to 25 mole percent of the first monomer of Formula (I).

Item 11 is the polymer of item 9 or 10, wherein the polymer is in a form of particles or beads.

Item 12 is the polymer of any one of items 9 to 11, wherein the polymerizable composition further comprises a crosslinker that is not of Formula (I).

Item 13 is a method of preparing a crosslinked polymeric material. The method comprises preparing a polymerizable composition. The polymerizable composition contains a) a monomer mixture and b) a free radical initiator. The monomer mixture includes i) a first monomer that is a crosslinker of Formula (I) and ii) a second monomer that is styrene, styrene substituted with one or more alkyl groups, alkyl (meth)acrylate, or a combination thereof. In Formula (I), each R1 is independently hydrogen, halo, alkyl, aryl, alkaryl, or aralkyl. Each R2 is independently hydrogen, alkyl, alkoxy, aryl, alkaryl, aralkyl, hydroxyl, silyloxy, combines with a R3 connected to a same carbon atom to form a cyclic alkyl, combines with a R3 connected to the same carbon atom to form a cyclic alkyl that is fused to one or more carbocyclic rings, or combines with R3 and the carbon atom to which both R2 and R3 are connected to form a carbonyl group. Each R3 is independently hydrogen, alkyl, alkoxy, aryl, alkaryl, aralkyl, hydroxyl, silyloxy, combines with a R2 connected to a same carbon atom to form a cyclic alkyl, combines with a R2 connected to the same carbon atom to form a cyclic alkyl that is fused to one or more carbocyclic rings, combines with R2 and the carbon to which both R2 and R3 are connected to form a carbonyl group, or combines with R4 connected to adjacent carbon atom to form a carbon-carbon bond. Each R4 is independently hydrogen or combines with R3 connected to an adjacent carbon atom to form a carbon-carbon bond. The amount of the crosslinker of Formula (I) in the monomer mixture is up to 25 mole percent based on moles of the second monomer. The method further includes subjecting the polymerizable composition to free radical polymerization to form the crosslinked polymeric material.

Item 14 is the method of item 13, wherein the polymerizable composition comprises (1) an organic phase comprising the monomer mixture and the free radical initiator and (2) an aqueous phase comprising water and a suspending agent, wherein the organic phase is suspended as droplets within the aqueous phase.

Item 15 is the method of item 13 or 14, wherein the method further comprises heating the crosslinked polymeric material to increase the degree of crosslinking.

EXAMPLES

TABLE 1

| Glossary of Materials | |
|---|---|
| Chemical Name | Chemical Supplier |
| 4,4'-Isopropylidene diphenol (BPA) | Alfa Aesar, Ward Hill, MA |
| Methane sulfonic acid (MSA) | Alfa Aesar, Ward Hill, MA |
| Methylene Chloride ($CH_2Cl_2$) | EMD Millipore Chemicals, Billerica, MA |
| Methanol (MeOH) | BDH Merck Ltd., Poole Dorset, UK |
| Pyridine | EM Science, Gibbstown, NJ |
| Trifluoromethane sulfonic acid (TFMSA) | Oakwood Products, West Columbia, SC |
| Concentrated hydrogen chloride (HCl) | EMD Millipore Chemicals, Billerica, MA |
| Sodium bicarbonate ($NaHCO_3$) | J. T. Baker, Phillipsburg, NJ |
| Sodium sulfate ($Na_2SO_4$) | BDH Merck Ltd., Poole Dorset, UK |
| N,N-dimethyl formamide (DMF) | Sigma-Aldrich, Milwaukee, WI |

TABLE 1-continued

Glossary of Materials

| Chemical Name | Chemical Supplier |
|---|---|
| Vinyl tributyltin | Sigma-Aldrich, Milwaukee, WI |
| Lithium chloride (LiCl) | Mallinckrodt, St. Louis, MO |
| Bis(triphenylphosphine)palladium (II) chloride | Sigma-Aldrich, Milwaukee, WI |
| Diethyl ether (Et$_2$O) | EMD Millipore Chemicals, Billerica, MA |
| Potassium fluoride (KF) | J. T. Baker, Phillipsburg, NJ |
| Ethyl acetate (EtOAc) | EMD Millipore Chemicals, Billerica, MA |
| Petroleum ether (PE) | EMD Millipore Chemicals, Billerica, MA |
| Benzoyl peroxide (BPO) | LUPEROX 98 from Sigma-Aldrich, Milwaukee, WI |
| Styrene | Alfa Aesar, Ward Hill, MA |
| Divinylbenzene (DVB) (80 percent, technical grade); the technical grade contains about 20 weight percent ethyl styrene. The calculation of moles of DVB used to prepare the polymeric material does not take into account the purity. | Sigma-Aldrich, Milwaukee, WI |
| Polyvinyl alcohol (PVA) (product 41240, 86-89% hydrolyzed, medium molecular weight) | Alfa Aesar, Ward Hill, MA |

Hi-Resolution Thermogravimetric Analysis (TGA)

Samples analyzed using TGA were prepared by loading the sample onto previously tared platinum TGA sample pans. The samples were analyzed using the Model Q5000IR Hi-Res Thermogravimetric Analyzer (TGA) from TA Instruments. A linear heating rate of 20° C./minute was applied with a high resolution setting of 1.0. Under these conditions, the instrument heats until weight loss is detected, the temperature stabilizes until weight loss diminishes, and then heating recommences. The samples were subjected to a heating profile ranging from 5° C. to 800° C. in a nitrogen atmosphere. The reported value for each sample is the derivative weight signal of the onset of significant weight loss temperature observed.

Modulated Differential Scanning Calorimetry (MDSC)

The samples were each heated at 200° C. for one hour prior to analysis. Each individual sample was prepared by weighing and loading into T$_{zero}$ aluminum pans from TA Instruments. The samples were analyzed using the Model Q2000 (#130, Cell RC-02499) MOUDLATED Differential Scanning calorimeter from TA Instruments. The following method was used for the analysis of each sample: 1) equilibrate at 30.00° C., 2) isothermal for 5.00 minute, 3) data storage on, 4) modulate ±1.00° C. every 60 seconds, 5) sampling interval—one point per second, 6) ramp 5.00° C./minute to 195.00° C., 8) isothermal for 1.00 minute, 9) ramp 5.00° C./minute to 30.00° C., 9) isothermal for 5.00 minutes, 10) ramp 5.00° C./minute to 195.00° C. The reported value for each sample is the midpoint from the first heat cycle.

Calculation of Mole Percent

The mole percent of the crosslinker is calculated by dividing the moles of crosslinker by the moles of second monomer and then multiplying the quotient by 100.

Preparatory Example 1

Synthesis of 3,3,3',3'-tetramethyl-1,1'-spirobisindan-6,6'-diol (SBI-diol)

In a 5.0 L round bottomed flask, 1000.69 grams (4.38 moles) of 4,4'-isopropylidene diphenol (BPA) was melted. Once all of the BPA was melted, 50.51 grams (0.526 moles) of methane sulfonic acid (MSA) was slowly added. The reaction mixture was stirred for 3 hours under a nitrogen atmosphere maintaining the temperature of the reaction mixture between 135° C. and 150° C. After 3 hours, while still hot, the molten reaction mixture was poured into 2.0 L of deionized water. A brown precipitate formed.

The resulting precipitate was isolated by vacuum filtration and washed with 1.5 L of deionized water. The isolated solid was then put back in the 5.0 L round bottomed flask and 1.5 L of methylene chloride (CH$_2$Cl$_2$) was added. The solid was stirred in the CH$_2$Cl$_2$ at reflux for one hour. The flask was then allowed to cool to room temperature (20° C. to 25° C.), and the flask was placed in a refrigerator (about 0° C.) overnight. The solid was then isolated by vacuum filtration and washed with a minimal amount (about 500 mL) of chilled CH$_2$Cl$_2$. The solid was then placed in a 4.0 L Erlenmeyer flask and dissolved in 900 mL of methanol (MeOH). To this solution was added 190 mL of CH$_2$Cl$_2$. The solution remained clear. The solution was stirred and 1.1 L of deionized water was added in portions. A white precipitate formed, and the mixture was placed in a refrigerator (about 0° C.) overnight. The solid was isolated by vacuum filtration and washed with a minimal amount (about 300 mL) of chilled CH$_2$Cl$_2$. The MeOH/CH$_2$Cl$_2$/H$_2$O precipitation was repeated once more. The solid from the second precipitation was dried in a vacuum oven at 85° C. overnight to yield 214.77 grams (48 percent) of SBI-diol. $^1$H NMR (500 MHz, acetone-d$_6$) δ 7.85 (s, 2H), 7.02 (d, J=8.1 Hz, 2H), 6.68 (dd, J=8.1, 2.4 Hz, 2H), 6.19 (d, J=2.4 Hz, 2H), 2.32 (d, J=13.0 Hz, 2H), 2.19 (d, J=13.0 Hz, 2H), 1.35 (s, 6H), 1.29 (s, 6H).

Preparatory Example 2

Synthesis of perfluoromethane-1-sulfonic acid 6'-(perfluoromethane-1-sulfonyloxy)-3,3,3',3'-tetramethyl-1,1'-spirobisindane-6-yl ester (SBI-bistriflate)

In a 250 mL round bottomed flask, 5.0025 g (16.2 millimolesmillimole) of SBI-diol and 4.755 mL (47.1 millimoles) of pyridine were dissolved in 150 mL of CH$_2$Cl$_2$. The flask was placed in an ice/water bath. To this solution was added dropwise 7.930 mL (58.8 millimoles) of trifluoromethane sulfonic anhydride (TFMSA). After the addition was complete, the flask was removed from the ice/water bath. The reaction mixture was stirred at room temperature under a nitrogen atmosphere for 1 hour. The reaction was stopped by adding 10 mL of aqueous hydrochloric acid (HCl) (10 percent by weight).

The resulting mixture was partitioned between CH$_2$Cl$_2$ and a saturated aqueous solution of sodium bicarbonate (NaHCO$_3$). The organic layer was isolated, dried over anhydrous sodium sulfate (Na$_2$SO$_4$) and filtered. The filtrate was condensed under reduced pressure and dried under high vacuum at room temperature for 3 hours to remove any residual pyridine. The resulting tan solid (SBI-bistriflate) weighed 8.51 grams (92 percent). $^1$H NMR (500 MHz, CDCl$_3$) δ 7.17 (d, J=8.3 Hz, 2H), 7.08 (dd, J=8.3, 2.3 Hz, 2H), 6.55 (d, J=2.3 Hz, 2H), 2.26 (ABq, J=13.2 Hz, 4H), 1.34 (s, 6H), 1.29 (s, 6H). $^{19}$F NMR (470.5 MHz, CDCl$_3$) δ −73.0.

Preparatory Example 3

Synthesis of 3,3,3',3'-tetramethyl-1,1'-spirobisindan-6,6'-divinyl (SBI-divinyl)

In a 250 mL round bottomed flask, 5.0025 grams (8.74 millimoles) of SBI-bistriflate was dissolved in 75 mL of anhydrous N,N-dimethyl formamide (DMF). To this solution was added 6.125 mL (21.0 millimoles) of vinyl tributyltin and 22.2225 grams (52.4 millimoles) of lithium chloride (LiCl). The reaction mixture was stirred at room temperature under a nitrogen atmosphere for 5 minutes before adding 0.6140 g (875 micromoles) of bis(triphenylphosphine)palladium (II) chloride. The reaction mixture was stirred at room temperature overnight under a nitrogen atmosphere. After reacting for 24 hours at room temperature, the reaction was stopped by pouring the reaction mixture into 150 mL of deionized water. A precipitate formed.

The aqueous layer and precipitate were extracted with diethyl ether (Et$_2$O) (3×200 mL). The organic layers were combined. The organic layer was then stirred vigorously at room temperature with an equal volume of aqueous potassium fluoride (KF) (10 grams/100 mL) for 1 hour. A gray-white precipitate formed and the mixture was vacuum filtered. The filtrate was then placed back in a separatory funnel and the organic layer isolated. The organic layer was then dried over anhydrous Na$_2$SO$_4$ and filtered. The filtrate was condensed under reduced pressure to yield a white solid. This solid was further purified by silica gel chromatography. The material was loaded onto a silica gel column (8×25 cm), and the column was eluted with 5% ethyl acetate (EtOAc)/95% petroleum ether (PE) (vol./vol.). Fractions containing the pure SBI-divinyl were combined, condensed under reduced pressure and dried under high vacuum at room temperature to yield 2.3822 g (83%) of SBI-divinyl as a white solid. $^1$H NMR (500 MHz, CDCl$_3$) δ 7.34 (dd, J=7.9, 1.6 Hz, 2H), 7.17 (d, J=7.9 Hz, 2H), 6.85 (d, J=1.6 Hz, 2H), 6.64 (dd, J=17.6, 10.9 Hz, 2H), 5.62 (dd, J=17.6, 1.0 Hz, 2H), 5.12 (dd, J=10.9, 1.0 Hz, 2H), 2.32 (ABq, J=13.1 Hz, 4H), 1.42 (s, 6H), 1.36 (s, 6H).

Example 1

Polymerization of Styrene and DV-SBI (49.6: 1 Molar Ratio or 2 Mole Percent DV-SBI)

In an 8 mL vial, 0.791 grams (7.59 millimoles) of styrene and 50.1 mg (153 micromoles) of DV-SBI were dissolved in 0.789 grams of EtOAc. To this solution was added 15.9 milligrams (65.6 micromoles) of BPO. The polymerization mixture thus consisted of an EtOAc solution of a 49.6:1 molar ratio of styrene: DV-SBI at 52 weight percent solids and 1.9 weight percent BPO. The polymerization mixture was bubbled with nitrogen for 10 minutes. The vial was then capped and placed in a sand bath at 90° C. The polymerization was heated at this elevated temperature for 18 hours.

A clear solid had formed and was isolated by vacuum filtration and washed with EtOAc. The solid was placed in a 20 mL vial and 10 mL of EtOAc was added to the vial. The material was left sitting in the EtOAc for 30 minutes. The solid was again isolated by vacuum filtration and washed with EtOAc. The solid was placed in a 20 mL vial and 10 mL of EtOAc was added to the vial. The material was left sitting in the EtOAc overnight. The solid was again isolated by vacuum filtration and washed with EtOAc. The solid was then dried under high vacuum at 100° C. overnight.

Example 2

Polymerization of Styrene and DV-SBI (20.0: 1 Molar Ratio or 5 Mole Percent DV-SBI)

In an 8 mL vial, 0.791 grams (7.59 millimoles) of styrene and 0.125 grams (380 micromoles) of DV-SBI were dissolved in 0.789 grams of EtOAc. To this solution was added 15.7 milligrams (64.8 micromoles) of BPO. The polymerization mixture thus consisted of an EtOAc solution of a 20.0:1 molar ratio of styrene: DV-SBI at 54 weight percent solids and 1.7 weight percent BPO. The polymerization mixture was bubbled with nitrogen for 10 minutes. The vial was then capped and placed in a sand bath at 90° C. The polymerization was heated at this elevated temperature for 18 hours.

A clear solid had formed and was isolated by vacuum filtration and washed with EtOAc. The solid was placed in a 20 mL vial and 10 mL of EtOAc was added to the vial. The material was left sitting in the EtOAc for 30 minutes. The solid was again isolated by vacuum filtration and washed with EtOAc. The solid was placed in a 20 mL vial and 10 mL of EtOAc was added to the vial. The material was left sitting in the EtOAc overnight. The solid was again isolated by vacuum filtration and washed with EtOAc. The solid was then dried under high vacuum at 100° C. overnight.

Example 3

Polymerization of Styrene and DV-SBI (10.0: 1 Molar Ratio or 10 Mole Percent DV-SBI)

In an 8 mL vial, 0.791 grams (7.59 millimoles) of styrene and 0.250 grams (761 micromoles) of DV-SBI were dissolved in 0.789 grams of EtOAc. To this solution was added 16.0 milligrams (66.1 micromoles) of BPO. The polymerization mixture thus consisted of an EtOAc solution of a 10.0:1 molar ratio of styrene: DV-SBI at 57 weight percent solids and 1.5 weight percent BPO. The polymerization mixture was bubbled with nitrogen for 10 minutes. The vial was then capped and placed in a sand bath at 90° C. The polymerization was heated at this elevated temperature for 18 hours.

A clear solid had formed and was isolated by vacuum filtration and washed with EtOAc. The solid was placed in a 20 mL vial and 10 mL of EtOAc was added to the vial. The material was left sitting in the EtOAc for 30 minutes. The solid was again isolated by vacuum filtration and washed with EtOAc. The solid was placed in a 20 mL vial and 10 mL of EtOAc was added to the vial. The material was left sitting in the EtOAc overnight. The solid was again isolated by vacuum filtration and washed with EtOAc. The solid was then dried under high vacuum at 100° C. overnight.

Example 4

Suspension Polymerization of Styrene and DV-SBI (28.4: 1 Molar Ratio or 4 Mole Percent DV-SBI)

In a 100 mL flask, 0.1 grams (413 micromoles) of BPO and 0.5 grams (1.52 millimoles) of DV-SBI were dissolved in 4.5 grams (43.2 millimoles) of styrene. To this solution was added 20 mL of a solution of 1% by weight poly(vinyl alcohol) in water. This flask was placed in an oil bath at 80° C. and stirred with a 2 cm long magnetic stir bar. The flask was purged with nitrogen for five minutes. The sample was then left to stir in the oil bath for 8 hours. Polymer beads were then collected from the bath with vacuum filtration and rinsed with water. The beads were post-cured in a 150° C. oven for 30 minutes.

Comparative Example 1

Polymerization of Styrene and DVB (49.2: 1 Molar Ratio or 2 Mole Percent DVB)

In an 8 mL vial, 2.00 grams (19.2 millimoles) of styrene and 50.3 milligrams (386 micromoles) of divinylbenzene (DVB) were dissolved in 2.04 grams of EtOAc. To this solution was added 40.3 milligrams (166 micromoles) of BPO. The polymerization mixture thus consisted of an EtOAc solution of a 49.2:1 molar ratio of styrene: DVB at 50 weight percent solids and 2.0 weight percent BPO. The polymerization mixture was bubbled with nitrogen for 10 minutes. The vial was then capped and placed in a sand bath at 90° C. The polymerization was heated at this elevated temperature for 18 hours.

A white precipitate had formed and was isolated by vacuum filtration and washed with EtOAc. The solid was placed in a 20 mL vial and 10 mL of EtOAc was added to the vial. The material was left sitting in the EtOAc for 4 days. The solid was again isolated by vacuum filtration and washed with EtOAc. The solid was placed in a 20 mL vial and 10 mL of EtOAc was added to the vial. The solid was shaken on a wrist shaker for one hour. The solid was again isolated by vacuum filtration and washed with EtOAc. The solid was then dried under high vacuum at 100° C. overnight.

Comparative Example 2

Polymerization of Styrene and DVB (20.0: 1 Molar Ratio or 5 Mole Percent DVB)

In an 8 mL vial, 2.00 grams (19.2 millimoles) of styrene and 125 milligrams (962 micromoles) of DVB were dissolved in 2.04 grams of EtOAc. To this solution was added 40.0 milligrams (165 micromoles) of BPO. The polymerization mixture thus consisted of an EtOAc solution of a 20.0:1 molar ratio of styrene: DVB at 51 weight percent solids and 1.9 weight percent BPO. The polymerization mixture was bubbled with nitrogen for 10 minutes. The vial was then capped and placed in a sand bath at 90° C. The polymerization was heated at this elevated temperature for 18 hours.

A white precipitate had formed and was isolated by vacuum filtration and washed with EtOAc. The solid was placed in a 20 mL vial and 10 mL of EtOAc was added to the vial. The material was left sitting in the EtOAc for 4 days. The solid was again isolated by vacuum filtration and washed with EtOAc. The solid was placed in a 20 mL vial and 10 mL of EtOAc was added to the vial. The solid was shaken on a wrist shaker for one hour. The solid was again isolated by vacuum filtration and washed with EtOAc. The solid was then dried under high vacuum at 100° C. overnight.

Comparative Example 3

Polymerization of Styrene and DVB (10.0: 1 Molar Ratio or 10 Mole Percent DVB)

In an 8 mL vial, 2.00 grams (19.2 millimoles) of styrene and 250 mg (1.92 millimoles) of DVB were dissolved in 2.05 grams of EtOAc. To this solution was added 40.1 milligrams (166 micromoles) of BPO. The polymerization mixture thus consisted of an EtOAc solution of a 10.0:1 molar ratio of styrene: DVB at 52 weight percent solids and 1.8 weight percent BPO. The polymerization mixture was bubbled with nitrogen for 10 minutes. The vial was then capped and placed in a sand bath at 90° C. The polymerization was heated at this elevated temperature for 18 hours.

A white precipitate had formed and was isolated by vacuum filtration and washed with EtOAc. The solid was placed in a 20 mL vial and 10 mL of EtOAc was added to the vial. The material was left sitting in the EtOAc for 4 days. The solid was again isolated by vacuum filtration and washed with EtOAc. The solid was placed in a 20 mL vial and 10 mL of EtOAc was added to the vial. The solid was shaken on a wrist shaker for one hour. The solid was again isolated by vacuum filtration and washed with EtOAc. The solid was then dried under high vacuum at 100° C. overnight.

Comparative Example 4

Suspension Polymerization of Styrene and DVB (29.9: 1 Molar Ratio or 4 Mole Percent DVB)

In a 100 mL flask, 0.1 grams (413 micromoles) of BPO and 0.2 grams (1.54 millimoles) of DVB were dissolved in 4.8 grams (46.1 millimoles) of styrene. To this solution was added 20 mL of a solution of 1 percent by weight polyvinyl alcohol (PVA) in water. This flask was placed in an oil bath at 80° C. and stirred with a 2 cm long magnetic stir bar. The flask was purged with nitrogen for five minutes. The sample was then left to stir in the oil bath for 18 hours. Polymer beads were then collected from the bath with vacuum filtration and rinsed with water. The beads were post-cured in a 150° C. oven for 30 minutes.

Comparative Example 5

Suspension Polymerization of Styrene and DVB (8.9: 1 Molar Ratio or 10 Mole Percent DVB)

In a 50 mL flask, 0.09 grams (372 micromoles) of BPO and 0.45 grams (3.46 millimoles) of DVB were dissolved in 4.05 grams (38.9 millimoles) of styrene. To this solution was added 20 mL of a solution of 1 percent by weight PVA in water. This flask was placed in an oil bath at 80° C. and stirred with a 2 cm long magnetic stir bar. The flask was purged with nitrogen for five minutes. The sample was then left to stir in the oil bath for 17 hours. Polymer beads were then collected from the bath with vacuum filtration and rinsed with water. The beads were post-cured in a 140° C. oven for 90 minutes.

Characterization of Polymeric Material Using TGA and MDSC

Example 1-3 and Comparative Examples 1-3

Examples 1-3 and Comparative Examples 1-3 were analyzed by modulated differential scanning calorimetry (MDSC) to determine the glass transition temperature ($T_g$). These same six samples were also analyzed by thermogravimetric analysis (TGA) to determine whether or not there were differences in thermal stability.

A summary of these results can be seen in Table 2. Two trends are clear from this data. The use of the DV-SBI crosslinker in place of DVB results in materials with higher $T_g$ and enhanced thermal stability. Even at 2 mole percent, the DV-SBI provided a noticeable increase in $T_g$ of 5° C. and a significant increase in thermal stability (onset temperature 45° C. higher). As the amount of DV-SBI is increased, the differences in $T_g$ between the DVB crosslinked polymeric materials and the DV-SBI crosslinked polymeric materials become even greater (7° C. at 5 mole percent and 18° C. at 10 mole percent). The difference in the onset temperature for significant weight loss for the DV-SBI crosslinked materials was approximately 40° C. higher than for the DVB crosslinked materials regardless of the amount of crosslinker used.

TABLE 2

TGA and MDSC Characterization of Polymeric Materials

| Sample | Crosslinker | $T_g$ (° C.) | Onset Temperature (° C.) |
|---|---|---|---|
| CEx 1 | 2 mole percent DVB | 102 | 245 |
| CEx 2 | 5 mole percent DVB | 113 | 255 |
| CEx 3 | 10 mole percent DVB | 129 | 263 |
| Ex 1 | 2 mole percent DV-SBI | 107 | 290 |
| Ex 2 | 5 mole percent DV-SBI | 120 | 296 |
| Ex 3 | 10 mole percent DV-SBI | 147 | 306 |

Characterization of Polymeric Beads Using Compression Testing

Example 4 and Comparative Examples 4-5

Compression testing of the polymeric materials was done in a Q800 DMA (TA Instruments, New Castle, Del.) equipped with compression plates and operated in the controlled force mode. A single bead with a diameter between 0.83 mm and 0.95 mm was placed between the compression plates. The temperature was equilibrated at 25° C. The force was ramped at 4 N/min. to a level calculated by multiplying 13.53 N/mm$^2$ by the square of the bead diameter. While holding the constant load, the temperature was then ramped at a rate of 3° C./min. to 250° C. The compression resistance of the bead at each temperature was calculated by dividing the plate separation by the original diameter of the bead [(height±initial height)× 100]. The results of the analysis of Example 4, Comparative Example 4, and Comparative Example 5 are shown in the FIGURE. The compression resistance was plotted as a function of temperature.

Example 4, which was crosslinked with DV-SBI compressed at a higher temperature compared to both Comparative Example 4 and Comparative Example 5. Both of these comparative examples were crosslinked with DVB. The higher compression temperature of Example 4 is indicative of a polymeric material having a higher glass transition temperature than either of the comparative examples. Comparative Example 4 and Example 4 were prepared using comparable amounts of crosslinker. The rubbery states for both of these samples were at about the same percent compression (but at different temperatures), which indicates that both samples had about the same crosslink density.

The glass transition temperature can be determined for each sample in the FIGURE as the temperature at which the compression resistance shows a significant change. The glass transition temperature for Example 4 was comparable to that for Comparative Example 5 even though the crosslink density of Comparative Example 5 is significantly higher. The higher crosslink density of Comparative Example 5 is consistent with rubbery plateau occurring at a lower percent compression. Comparative Example 5 is more rigid in the rubbery plateau region than either Comparative Example 4 or Example 4.

Stated differently, to obtain a comparable glass transition temperature to Example 4 prepared using a crosslinker of Formula (I), about 2.5 times as much DVB was needed as in Comparative Example 5. However, the use of higher levels of crosslinker tends to result in the formation of a significantly more rigid polymeric material. In the compression test, the higher crosslink density of Comparative Example 5 resulted in the polymeric bead failed at about 60 percent compression while Example 4 did not fail until about 75 percent compression. The increased ability to be compressed without failure can be desirable in applications where the material needs to conform without breaking.

We claim:
1. A polymerizable composition comprising:
   a) a monomer mixture comprising
      i) a first monomer of Formula (I)

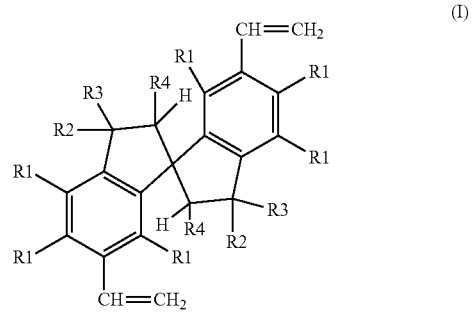

(I)

wherein
      each R1 is independently hydrogen, halo, alkyl, aryl, alkaryl, or aralkyl;
      each R2 is independently hydrogen, alkyl, alkoxy, aryl, alkaryl, aralkyl, hydroxyl, combines with a R3 connected to a same carbon atom to form a cyclic alkyl, combines with a R3 connected to the same carbon atom to form a cyclic alkyl that is fused to one or more carbocyclic rings, or combines with R3 and the carbon atom to which both R2 and R3 are connected to form a carbonyl group;
      each R3 is independently hydrogen, alkyl, alkoxy, aryl, alkaryl, aralkyl, hydroxyl, combines with a R2 connected to a same carbon atom to form a cyclic alkyl, combines with a R2 connected to the same carbon atom to form a cyclic alkyl that is fused to one or more carbocyclic rings, combines with R2 and the carbon to which both R2 and R3 are connected to form a carbonyl group, or combines with R4 connected to adjacent carbon atom to form a carbon-carbon bond; and
      each R4 is independently hydrogen or combines with R3 connected to an adjacent carbon atom to form a carbon-carbon bond; and
      ii) a second monomer that is styrene, styrene substituted with one or more alkyl groups, alkyl (meth)acrylate, or a combination thereof,
   wherein the first monomer of Formula (I) is present in an amount up to 25 mole percent based on moles of the second monomer; and
   b) a free radical initiator.
2. The polymerizable composition of claim 1, wherein each R1 of the first monomer is hydrogen or halo.

3. The polymerizable composition of claim 1, wherein each R2 and each R3 of the first monomer are alkyl.

4. The polymerizable composition of claim 1, wherein R4 of the first monomer is hydrogen.

5. The polymerizable composition of claim 1, wherein the first monomer is 3,3,3',3'-tetramethyl-1,1'-spirobisindan-6,6'-divinyl.

6. The polymerizable composition of claim 1, wherein the monomer mixture comprises 1 to 25 mole percent of the first monomer of Formula (I).

7. The polymerizable composition of claim 1, wherein the polymerizable composition comprises (1) an organic phase comprising the monomer mixture and a free radical initiator and (2) an aqueous phase comprising water and a suspending agent, wherein the organic phase is suspended as droplets within the aqueous phase.

8. The polymerizable composition of claim 1, wherein the polymerizable composition further comprises an additional crosslinker that is not of Formula (I).

9. A polymer comprising the polymerized product of a polymerizable composition comprising:
   a) a monomer mixture comprising
      i) a first monomer of Formula (I)

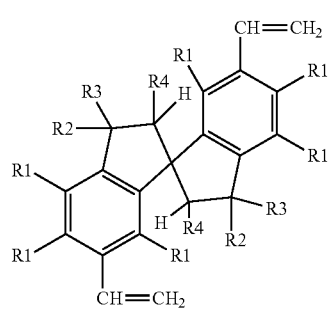

wherein
      each R1 is independently hydrogen, halo, alkyl, aryl, alkaryl, or aralkyl;
      each R2 is independently hydrogen, alkyl, alkoxy, aryl, alkaryl, aralkyl, hydroxyl, combines with a R3 connected to a same carbon atom to form a cyclic alkyl, combines with a R3 connected to the same carbon atom to form a cyclic alkyl that is fused to one or more carbocyclic rings, or combines with R3 and the carbon atom to which both R2 and R3 are connected to form a carbonyl group;
      each R3 is independently hydrogen, alkyl, alkoxy, aryl, alkaryl, aralkyl, hydroxyl, combines with a R2 connected to a same carbon atom to form a cyclic alkyl, combines with a R2 connected to the same carbon atom to form a cyclic alkyl that is fused to one or more carbocyclic rings, combines with R2 and the carbon to which both R2 and R3 are connected to form a carbonyl group, or combines with R4 connected to adjacent carbon atom to form a carbon-carbon bond; and
      each R4 is independently hydrogen or combines with R3 connected to an adjacent carbon atom to form a carbon-carbon bond; and
      ii) a second monomer that is styrene, styrene substituted with one or more alkyl groups, alkyl (meth)acrylate, or a combination thereof
   wherein the first monomer of Formula (I) is present in an amount up to 25 mole percent based on moles of the second monomer; and
   b) a free radical initiator.

10. The polymer of claim 9, wherein the monomer mixture comprises 1 to 25 mole percent of the first monomer of Formula (I).

11. The polymer of claim 9, wherein the monomer mixture further comprises a crosslinker that is not of Formula (I).

12. The polymer of claim 9, wherein the polymer is in a form of particles or beads.

13. A method of preparing a crosslinked polymeric material, the method comprising:
   preparing a polymerizable composition comprising
      a) a monomer mixture comprising
         i) a first monomer of Formula (I)

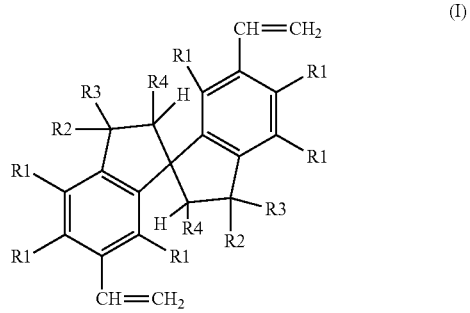

wherein
      each R1 is independently hydrogen, halo, alkyl, aryl, alkaryl, or aralkyl;
      each R2 is independently hydrogen, alkyl, alkoxy, aryl, alkaryl, aralkyl, hydroxyl, combines with a R3 connected to a same carbon atom to form a cyclic alkyl, combines with a R3 connected to the same carbon atom to form a cyclic alkyl that is fused to one or more carbocyclic rings, or combines with R3 and the carbon atom to which both R2 and R3 are connected to form a carbonyl group;
      each R3 is independently hydrogen, alkyl, alkoxy, aryl, alkaryl, aralkyl, hydroxyl, combines with a R2 connected to a same carbon atom to form a cyclic alkyl, combines with a R2 connected to the same carbon atom to form a cyclic alkyl that is fused to one or more carbocyclic rings, combines with R2 and the carbon to which both R2 and R3 are connected to form a carbonyl group, or combines with R4 connected to adjacent carbon atom to form a carbon-carbon bond; and
      each R4 is independently hydrogen or combines with R3 connected to an adjacent carbon atom to form a carbon-carbon bond; and
         ii) a second monomer that is styrene, styrene substituted with one or more alkyl groups, alkyl (meth)acrylate, or a combination thereof
      wherein the first monomer of Formula (I) is present in an amount up to 25 mole percent based on moles of the second monomer; and
      b) a free radical initiator; and
   subjecting the polymerizable composition to free radical polymerization to form the crosslinked polymeric material.

14. The method of claim 13, wherein the polymerizable composition comprises (1) an organic phase comprising the monomer mixture and the free radical initiator and (2) an aqueous phase comprising water and a suspending agent, wherein the organic phase is suspended as droplets within the aqueous phase.

15. The method of claim 13, wherein the method further comprises heating the crosslinked polymeric material to increase the degree of crosslinking.

* * * * *

UNITED STATES PATENT AND TRADEMARK OFFICE
CERTIFICATE OF CORRECTION

PATENT NO. : 9,139,674 B2
APPLICATION NO. : 14/430062
DATED : September 22, 2015
INVENTOR(S) : Michael Wendland Page 1 of 1

It is certified that error appears in the above-identified patent and that said Letters Patent is hereby corrected as shown below:

In the specification

Column 13
Line 39, delete "(c.g.," and insert -- (e.g., --, therefor.

Column 14
Lines 42-43, delete "(2-methylproprionate))," and insert -- (2-methylpropionate)), --, therefor.

Column 15
Line 18, delete "(n-penyl" and insert -- (n-phenyl --, therefor.

Column 18
Line 62, delete "Formula (I)," and insert -- Formula (I). --, therefor.

Column 21
Line 41, delete "MOUDLATED" and insert -- MODULATED --, therefor.

Line 42, delete "calorimeter" and insert -- Calorimeter --, therefor.

Signed and Sealed this
Seventh Day of June, 2016

Michelle K. Lee
*Director of the United States Patent and Trademark Office*